C. GABEL.
PRESSURE GAUGE.
APPLICATION FILED MAR. 5, 1920.
1,414,121.
Patented Apr. 25, 1922.
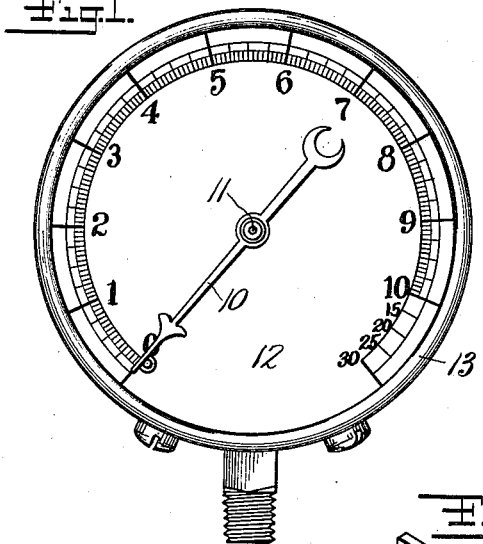
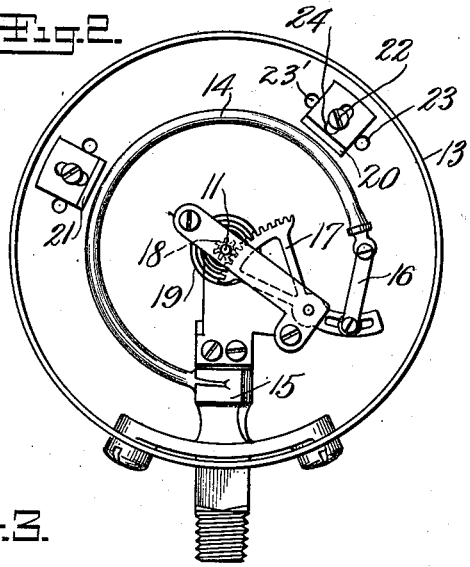
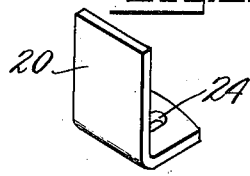
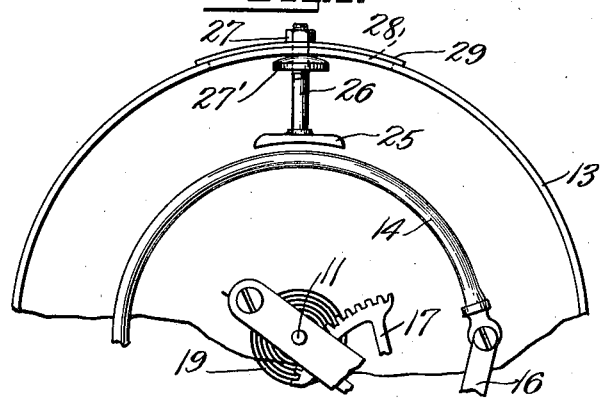
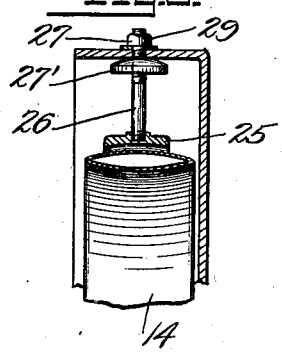
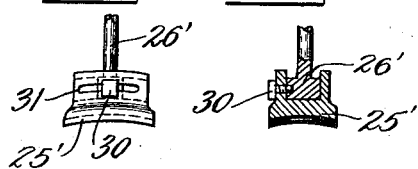
Inventor
C. Gabel
By his Attorneys

UNITED STATES PATENT OFFICE.

CARL GABEL, OF ALLENTOWN, PENNSYLVANIA, ASSIGNOR TO UNITED STATES GAUGE COMPANY, OF NEW YORK, N. Y., A CORPORATION OF PENNSYLVANIA.

PRESSURE GAUGE.

1,414,121.  Specification of Letters Patent.  Patented Apr. 25, 1922.

Application filed March 5, 1920. Serial No. 363,438.

*To all whom it may concern:*

Be it known that I, CARL GABEL, a citizen of the United States of America, residing at Allentown, Lehigh County, Pennsylvania, have invented a new and useful Pressure Gauge, of which the following is a specification.

My invention relates particularly to a Bourdon type gauge, and the main object is to provide simple and reliable means for modifying the action of the tube so as to provide a sensitive gauge for accurate reading over what may be termed a normal scale, and so modifying the action of the tube above the normal scale that a wide range of pressures is indicated over a small angular distance on the dial.

To accomplish this result I provide a stop, which checks the movement of a portion of the tube intermediate its ends, so that the effective movement of the end of the tube is retarded or reduced in angular movement.

Figure 1 is a front view of a gauge embodying the improvements of my invention;

Fig. 2 is a front view with the cover and dial removed;

Fig. 3 is a perspective view of one of the stops;

Fig. 4 is a fragmentary front view showing a modification;

Fig. 5 is a transverse sectional view of a portion of the same; and

Figs. 6 and 7 are detail views of a modified form of stop.

The pointer 10 is carried by a spindle or shaft 11 in front of the dial 12 in the casing 13.

The tube 14 has one end supported by the base 15 and its movable end connected by a link 16 to the sector 17, which engages the pinion 18 on the pointer shaft 11. A spring 19 tends to move the pointer toward the zero position of the scale, as is customary.

Through the normal range of the scale, say from zero to 10, the action of the gauge is the same as that ordinarily found in constructions of this character. To modify the action above the scale reading 10 or such other reading as may be selected, I provide one or more stops, such as 20 and 21, secured to the casing in the path of the expansive movement of the tube. As the tube expands it engages one or the other, or both, of the stops 20 or 21, depending upon the location of the stops and the expansive characteristics of the tube. The tube may first engage the stop 20 and slide along it until the tube engages the stop 21. In this case the engagement of the tube with the stops reduces the movement of the end of the tube in response to a given increase of pressure, so that the scale readings, say from 10 to 30, will be much closer together than the scale readings below 10. Preferably each of the stops is secured to the casing, for instance, by means of a screw 22 screwed into the casing. A number of holes, such as 23 and 23', may be provided, disposed circumferentially of the casing, so as to permit the position of the stop to be altered circumferentially with relation to the tube. The base of the stop may be slotted, as at 24, to permit the stop to be readily adjusted. These adjustments permit the location of the stops so as to make the action of the pointer correspond accurately to the scale.

In the form shown in Figs. 4 and 5 the stop 25 is carried by a rod or bolt 26, having adjusting clamping nuts 27 and 27', so that the stop may be adjusted radially with respect to the tube. The rod 26 may be circumferentially adjusted in a slot 28 and carried by a slide 29. It is thus possible to adjust the shoe or stop 25 to the desired position, so as to modify the action of the gauge at the upper range of pressures.

In the form of stop or shoe shown in Figs. 6 and 7, the shoe 25' has a groove for the end of the rod 26', and the parts are held together by a bolt 30, which passes through a slot 31 and screws into the end of the rod. In this way the shoe may be adjusted circumferentially without adjusting the rod 26'.

It will be obvious that other changes may be made in the construction and arrangement of the parts without departing from the spirit or scope of my invention.

I claim:

1. In a pressure gauge, a Bourdon tube, an indicating mechanism connected to said tube and adapted to be actuated by the latter, and a stop adapted to contact with a portion of said tube intermediate its ends, said stop being adjustable circumferentially relatively to said tube whereby it may engage the latter at different points intermediate its ends.

2. In a pressure gauge, a Bourdon tube, an indicating mechanism connected to said tube and adapted to be actuated by the latter, an adjustable stop adapted to contact with a portion of said tube intermediate its ends when a certain pre-determined pressure has been reached, and a second stop adapted to contact with a different portion of said tube when a certain other pressure has been reached.

3. In a pressure gauge, a Bourdon tube, an indicating mechanism connected therewith, a stop arranged to engage the tube intermediate its length, said stop being adjustable toward and from the tube and also longitudinally of the tube whereby the time of engagement of said tube with said stop may be varied and whereby the degree of resistance to the flexing of the tube by the action of the stop may also be varied.

CARL GABEL.